US008533526B2

(12) United States Patent
Swanson et al.

(10) Patent No.: US 8,533,526 B2
(45) Date of Patent: *Sep. 10, 2013

(54) PERFORMING REDUNDANT MEMORY HOPPING

(71) Applicants: Robert C. Swanson, Olympia, WA (US); Mallik Bulusu, Olympia, WA (US)

(72) Inventors: Robert C. Swanson, Olympia, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,154

(22) Filed: Oct. 8, 2012

(65) Prior Publication Data

US 2013/0031322 A1 Jan. 31, 2013

Related U.S. Application Data

(63) Continuation of application No. 13/307,547, filed on Nov. 30, 2011, which is a continuation of application No. 12/643,345, filed on Dec. 21, 2009, now Pat. No. 8,090,977.

(51) Int. Cl.
*G06F 11/07* (2006.01)

(52) U.S. Cl.
USPC ........... 714/6.1; 714/6.23; 714/6.3; 714/6.32; 711/162

(58) Field of Classification Search
USPC ................................. 714/6.1, 6.23
See application file for complete search history.

(56) References Cited

U.S. PATENT DOCUMENTS

| | | | |
|---|---|---|---|
| 4,044,333 A | 8/1977 | Auspurg et al. | |
| 5,488,716 A | 1/1996 | Schneider et al. | |
| 6,151,665 A | 11/2000 | Blumenau | |
| 6,591,352 B2 | 7/2003 | Lambino | |
| 6,820,182 B1 | 11/2004 | Bauman et al. | |
| 6,848,039 B1 | 1/2005 | Aaron et al. | |
| 7,036,007 B2 | 4/2006 | Schelling et al. | |
| 7,062,628 B2 | 6/2006 | Amano | |
| 7,107,405 B2 | 9/2006 | Lovelace | |
| 7,213,152 B1 | 5/2007 | Gafken et al. | |
| 7,305,668 B2 | 12/2007 | Kennedy et al. | |
| 7,890,811 B2 | 2/2011 | Rothman et al. | |
| 7,949,850 B2 | 5/2011 | Swanson et al. | |
| 2002/0032816 A1* | 3/2002 | Bakke et al. | 710/74 |
| 2002/0178352 A1 | 11/2002 | Lambino et al. | |
| 2005/0060514 A1* | 3/2005 | Pomaranski et al. | 711/202 |
| 2005/0210180 A1 | 9/2005 | Rothman et al. | |
| 2006/0187739 A1 | 8/2006 | Borkenhagen et al. | |
| 2006/0206661 A1 | 9/2006 | Gaither | |
| 2008/0005551 A1 | 1/2008 | Swanson et al. | |

(Continued)

OTHER PUBLICATIONS

U.S. Appl. No. 12/645,778, filed Dec. 23, 2009, entitled, "Controlling Memory Redundancy in a System," by Robert C. Swanson, et al.

*Primary Examiner* — Chae Ko
(74) *Attorney, Agent, or Firm* — Trop, Pruner & Hu, P.C.

(57) ABSTRACT

In one embodiment, the present invention includes a method for receiving an indication of a loss of redundancy with respect to a pair of mirrored memory regions of a partially redundant memory system, determining new mirrored memory regions, and dynamically migrating information stored in the original mirrored memory regions to the new mirrored memory regions. Other embodiments are described and claimed.

19 Claims, 5 Drawing Sheets

(56) References Cited

U.S. PATENT DOCUMENTS

| | | |
|---|---|---|
| 2008/0059492 A1* | 3/2008 | Tarin .......................... 707/100 |
| 2008/0126431 A1* | 5/2008 | Walliser et al. ............... 707/200 |
| 2008/0184071 A1* | 7/2008 | Holt ............................. 714/20 |
| 2008/0229003 A1 | 9/2008 | Mizushima et al. |
| 2009/0006048 A1 | 1/2009 | Wang et al. |
| 2009/0006837 A1 | 1/2009 | Rothman et al. |
| 2009/0059674 A1* | 3/2009 | Fukuda et al. ........... 365/185.22 |
| 2009/0064274 A1 | 3/2009 | Zimmer et al. |
| 2009/0077336 A1* | 3/2009 | Shibayama et al. .......... 711/165 |
| 2009/0164742 A1* | 6/2009 | Wach et al. .................. 711/162 |
| 2009/0164837 A1 | 6/2009 | Swanson et al. |
| 2009/0172323 A1 | 7/2009 | Swanson et al. |
| 2009/0282300 A1* | 11/2009 | Heyrman et al. ............. 714/708 |
| 2010/0115330 A1 | 5/2010 | Khatri et al. |
| 2010/0287433 A1* | 11/2010 | Mu ............................... 714/746 |
| 2011/0173385 A1 | 7/2011 | Swanson et al. |
| 2012/0054543 A1 | 3/2012 | Dreier |

\* cited by examiner

PERFORMING REDUNDANT MEMORY HOPPING

This application is a continuation of U.S. patent application Ser. No. 13/307,547, filed Nov. 11, 2011, which is a continuation of U.S. patent application Ser. No. 12/643,345, filed Dec. 21, 2009, which is now U.S. Pat. No. 8,090,977, the contents of which are hereby incorporated by reference.

BACKGROUND

In today's world of ubiquitous servers, maintaining good server reliability and uptime is almost mandatory. To maintain significant system uptime, system designers build reliability, availability, serviceability, manageability (RASM) features to improve overall system reliability and availability. Thus, it is common to find various degrees of redundancy, error correction, error detection and error containment techniques employed at different levels in the system hierarchy. One of the most common types of system failure is attributed to system memory errors. Hence, the memory subsystem (especially dual in-line memory modules (DIMMs)) receives particular attention in this regard.

Though modern memory employs error correction codes (ECC) to detect and/or correct single and double-bit errors, higher order multi-bit errors still pose a significant problem for system reliability and availability. Thus techniques like memory mirroring are used to reduce the likelihood of system failure due to memory errors. Mirroring is typically performed statically by system firmware, which provides full redundancy for the entire memory range in a manner largely transparent to an underlying operating system/virtual machine monitor (OS/VMM). However, it is not very cost-effective and therefore tends to be deployed only on very high-end and mission-critical systems. This is so, since the effective usable memory is reduced to about half while power consumption for the same amount of usable memory is effectively doubled. Also, with the cost of memory being a significant percentage of overall hardware cost, doubling it for redundancy purposes alone poses practical challenges for wide adoption.

Memory mirroring thus provides two identical copies (also referred to as mirrors). If one portion of the memory goes down or breaks, the other can provide requested data so that code and data integrity is preserved. A technique has been proposed to utilize mirroring on a more granular scale of less than half of the total memory space and to allow the OS to direct the final mirrored size. However, this does not fully solve platform problems. For example, assume that in a partially mirrored system, the OS creates a small memory mirror of less than half the memory. If the mirror breaks, e.g., due to an uncorrectable error, that memory range will continue in a non-redundant state until the mirror is reconfigured on a subsequent power on self test (POST).

DETAILED DESCRIPTION

In various embodiments, techniques are provided to create, remove, migrate, and replace memory mirrors dynamically or on the fly. These migration operations may be referred to as redundant memory hopping. In different implementations, such memory hopping may be effected by the operating system (OS). In general, the OS will first determine whether a platform supports partial memory mirroring, also referred to as variable memory mirroring. If so, configuration information, e.g., obtained from an Advanced Configuration and Power Interface (ACPI) method such as in accordance with the ACPI Specification version 4.0 (Jun. 16, 2009) may be used to ascertain both the possible memory configuration based upon the memory installed and the current resource setting. In one embodiment, the configuration information may include a current resource setting (CRS) obtained using a _CRS method of ACPI and a possible resource setting (PRS) obtained using a _PRS method of ACPI. The OS will then configure the memory and utilize the mirrored range for information of criticality (e.g., kernel space or high availability system memory as described below) that is to be mirrored.

Figure 1:
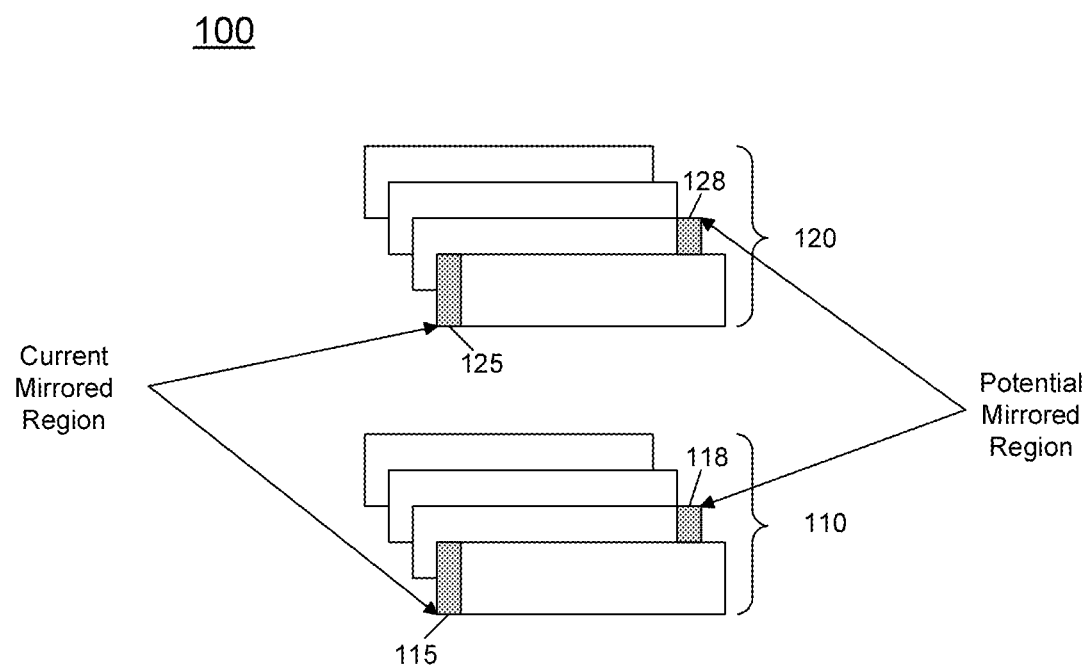
FIG. 1 is a block diagram of a memory in accordance with one embodiment of the present invention.

Referring now to FIG. 1, shown is a block diagram of a memory in accordance with one embodiment of the present invention. As shown in FIG. 1, memory 100 may be a system memory, e.g., a dynamic random access memory (DRAM) or other such type of memory. In some implementations, the memory may be implemented as dual in-line memory modules (DIMMs) although other memory configurations such as single in-line memory modules (SIMMs) or other such memories can be used. As seen, memory 100 may include multiple modules that in turn can be partitioned into multiple partitions such as banks, channels, or so forth. In the context of FIG. 1, memory 100 may be partitioned into a first bank 110 and a second bank 120. Note that while shown with this implementation in FIG. 1, embodiments can be utilized where the memory does not have tight affinity to a given processor such as a so-called far memory that acts as higher latency coherent memory, but is off the logical platform and connected, e.g., via a bus.

In an implementation in which variable memory mirroring is possible, only a small portion of the total available memory may be allocated for mirroring. Specifically as seen in FIG. 1, a first mirror portion 115 may be present in first bank 110 and a corresponding mirror portion 115 may be present in second bank 120. The information stored in the mirrored portions may be critical information for the system, e.g., an OS, virtual machine monitor (VMM), or data for use in such critical code. Also assume that bank 110 acts as a master memory, while bank 120 acts as a slave memory with regard to the mirrored regions.

Accordingly, with the configuration shown in FIG. 1, an OS may determine that this configuration is the current configuration setting of the system. Such information may be obtained, e.g., using a current resource setting method, e.g., a _CRS method of ACPI. In one embodiment, tables stored in memory can be provided to the OS at runtime. In some instances, these tables too may be hopped to keep the system operational.

Still further, the OS may also determine other possible memory configurations. For example, assume that at least one other region of the memory banks can be possibly allocated for mirrored data. In the embodiment of FIG. 1, regions 118 and 128 may be allocated for possible mirroring. Such information may be obtained, e.g., using a possible configuration setting method, e.g., a _PRS method of ACPI. While shown with this particular implementation with example current and possible configuration settings of mirrored regions in FIG. 1, understand the scope of the present invention is not limited in this regard and additional memory can be allocated for mirroring operations, both currently and for possible mirroring in the future.

Given the current settings of the memory as shown in FIG. 1, the OS will start utilizing redundant regions 115 and 125 for critical information and enable the regions 118 and 128 that can possibly be configured as a memory mirror for other usages. During operations, memory errors can be reported via an ACPI Platform Error Information (APEI) according to an ACPI specification. When an uncorrectable error occurs in one of the mirrored memory regions 115 and 125, the OS may receive a notification from hardware, e.g., an error interrupt following the rules for an APEI or ACPI Platform Error Interrupt. This notification indicates that the memory mirror has been broken.

At this time, the OS may evict application/kernel code/data utilizing the previously "mirrorable" (but unmirrored) memory regions 118 and 128 into different memory ranges. The OS can then configure this memory range as mirrored, e.g., via a set resource setting (_SRS) ACPI method. The OS will then migrate or hop the critical application code/data to the newly established memory mirror formed of regions 118 and 128. Then the original mirrored regions 115 and 125 may be reclaimed for other use by the OS.

Note that migration may not occur only because of error indications. That is, in some embodiments by using minimal mirrored regions to support only critical information, the memory can be maintained almost forever, as these critical components can be dynamically hopped over the entirety of the DIMMs over time. As one example, dynamic migration can be set to be performed on a predetermined interval, e.g., between approximately 18 months and two years, even in the absence of errors occurring. In one embodiment, this setting would reside in BIOS so that BIOS would force a false error indication to induce an OS level memory hop, as described further below.

Figure 2:
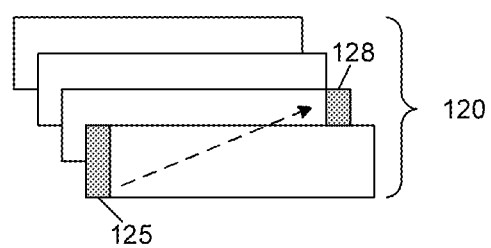
FIG. 2 is block diagram of memory hopping according to an embodiment of the present invention.
Figure 2:
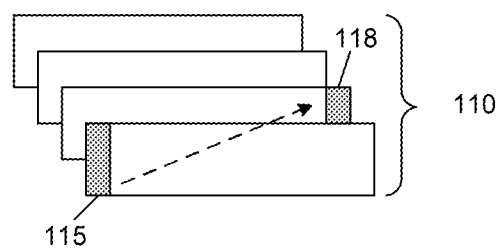

Referring now to FIG. 2, shown is block diagram of memory hopping according to an embodiment of the present invention. As shown in FIG. 2, assume that an uncorrectable error has occurred somewhere in one of regions 115 and 125. To prevent loss of critical information, the OS may migrate or hop the contents of the redundant memory regions to another region. Specifically, as seen the mirrored information of regions 115 and 125 may be migrated to regions 118 and 128, respectively. Then regions 115 and 125 can be made available for other application usage. While shown as hopping to these particular regions of memory which were indicated to be available for possible mirroring, understand that the scope of the present invention is not limited in this regard. That is, it is possible that other regions of memory 100 may be identified as possible mirror targets and thus the memory hopping may be to other regions of the memory. Note that while shown in FIG. 2 as mirroring between nodes, the scope of the present invention is not limited in this regard. For example, mirrored regions may be present within the same bank or DIMM but in different ranks or channels. Hopping in general can exist beyond the notion of bank, rank or channel, and occur from one blob of redundant memory to another redundant blob of memory.

Figure 3:
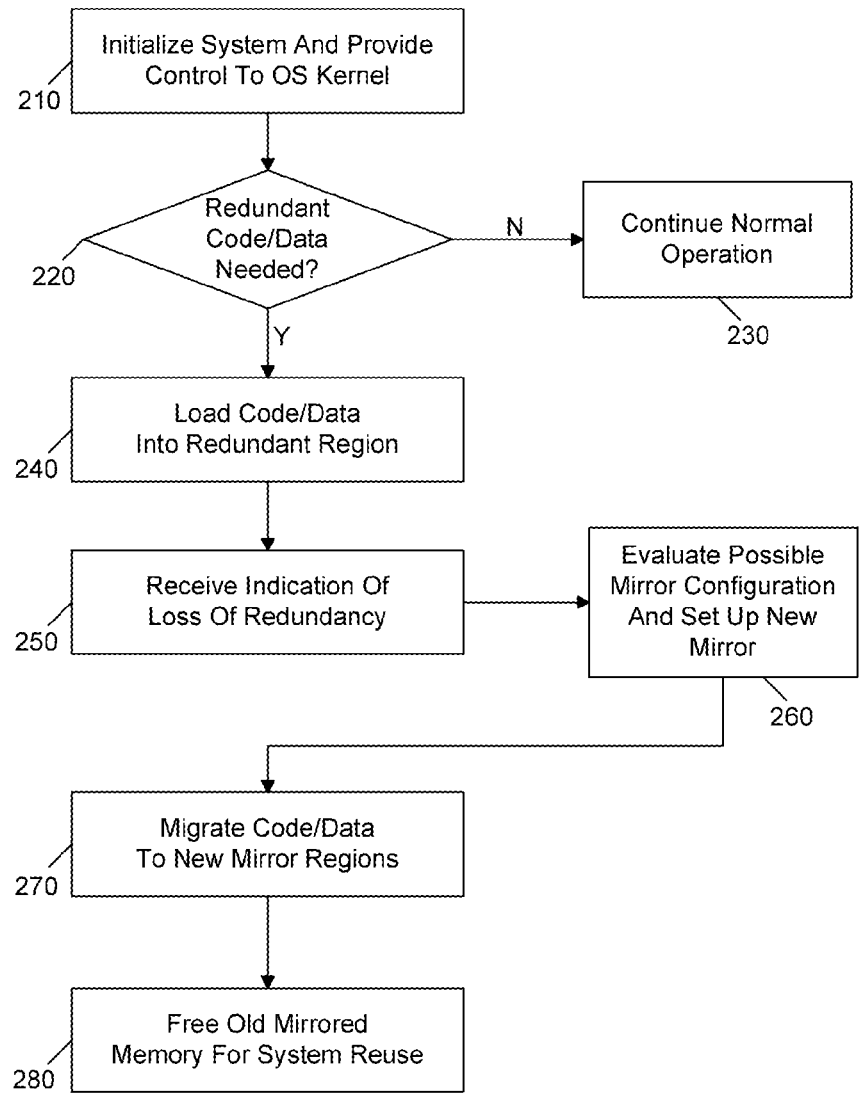
FIG. 3 is a flow diagram of a method in accordance with one embodiment of the present invention.

Referring now to FIG. 3, shown is a flow diagram of a method in accordance with one embodiment of the present invention. As shown in FIG. 3, method 200 may be implemented, e.g., using an OS/VMM or other system software to perform memory mirroring, both on initial configuration of a system, as well as to perform dynamic migration or hopping of redundant data between mirrored regions during system operation. As seen in FIG. 3, method 200 may begin by performing system initialization and providing control to an OS kernel (block 210). For example, on system startup basic input/output system (BIOS) software including power on self test (POST) operations may be performed to initialize various low level features of the system. When successfully tested and initialized, control may pass from the BIOS to an OS/VMM for further initialization operations and to place the system into a valid configuration to begin operations. As part of this OS initialization, control passes to diamond 220 where it may be determined whether redundant code/data is needed. That is, different platforms may be controlled to enable mirroring or partial mirroring of data depending on a particular market segment for the platform. For example, for low-end consumer-based systems such as laptops, desktops and so forth, no such mirroring may be needed. Accordingly, control passes to block 230 for normal system operations.

However, in other implementations such as high availability servers, data centers and so forth, such redundant code/data stores may be desired. Accordingly, in these implementations, the OS may determine an initial configuration for redundant regions as well as determine other possible regions available for such redundant operations. As discussed above, in some implementations ACPI methods may be used for these determinations. These determinations may include, in one embodiment a determination as to how much of the total available memory will be allocated for redundancy. For example, in different implementations this percentage may be well under 50% of the total memory (note that a 50% level indicates complete mirroring, as all information stored in 50% of the total memory is mirrored over to the remaining 50%). While the scope of the present invention is not limited in this regard, assume that a partial mirroring configuration, without loss of generality, may allocate between 5 and 10% of the available memory for mirroring. In one embodiment, the OS may access a current resource setting that indicates the current regions of memory that are mirrored and potential resource settings, and based on this information determine how many regions can be mirrored, and where the mirrored regions are to be located.

Control then passes to block 240, where the OS may load code/data into the redundant regions. The particular information to be allocated to these regions is implementation specific, but in many instances may include critical information including OS/VMM code and data structures for supporting such code, as well as critical applications or virtual machines (VMs). As an example, assume that a VMM that oversees a number of VMs can set priorities for these different VMs, e.g., depending on an importance of the individual VMs. This importance may in some embodiments directly tie to a payment level for a user's access to the VM. For example, assume that a first VM is associated with a first user who pays 2×dollars for use of the VM, while a second VM is associated with a second user who pays X dollars for use of the VM. In this instance, the first VM may be determined to be more critical than the second VM and accordingly may have its code and information stored in a redundant region. In other words, the first VM (and associated user) may be of a first QoS level, and the second VM (and associated user) may be of a second QoS level, where the first QoS level is greater than the second QoS level. Note that in various embodiments, more than two such levels may be present.

Thus in implementations where there are multiple regions of mirrored memory, application-level programs such as VMs can be segmented into critical VMs and non-critical VMs. The critical VMs may be allocated to mirrored memory regions. In this way, usage of these mirrored regions for critical VMs can be billed to a user associated with the VMs. Thus with multiple disparate regions of variable memory mirroring the OS can track usage of the regions, enabling billing for that usage. In this way, a cost for that range of memory can be allocated to a particular client.

Still with reference to FIG. 3, at this point (after loading code/data in block 240), a system may be configured and normal operation may begin. During execution, assume that a system monitor such as the OS receives an indication of a loss of redundancy (block 250). For example, hardware may send an indication to the OS, e.g., via an interrupt such as system control interrupt (SCI) or via a BIOS system management interrupt (SMI) in which the BIOS will signal the operating system. This interrupt may be an indication of an event occurring with regard to the redundant memory by which the OS would desire to hop the memory to retain the billed QoS or to ensure its own infrastructure remains intact. For example a log of correctable errors may be sent to the BIOS (and the BIOS can forward to the OS) or directly to the OS. If the number of correctable errors in a given time frame crosses a threshold, the OS may consider taking protective action such as migrating the redundant memory region. In other examples, this indication of loss of redundancy may be via an uncorrectable error in the redundant region.

Of course, as described above, embodiments may perform migration even where no error has occurred. Note that in some embodiments, BIOS may cause a false positive error to simulate an error to trigger an OS-based migration. That is, a BIOS may have access to various memory information, such as how long the memory has been utilized, performance level, operating metrics and so forth. Thus, BIOS has access to various information, including hardware, performance monitors, counters and so forth to aid in mirroring decisions. Using a false positive to break the mirror or initiate an ACPI interrupt to the OS to indicate that the existing mirror region will soon become unstable may enable a pre-migration. Or the BIOS could choose to let the OS see a critical error, and then handle the migration.

Accordingly, control passes to block 260 where possible mirror configurations may be evaluated and a new mirror may be set up. For example, the OS, e.g., using an ACPI method, may determine available memory configurations for mirroring and set up a new mirror to be the current mirrored region. Accordingly, control passes to block 270, where code/data stored in the previous mirror region may be migrated over to the new mirrored region. Then the previous mirrored memory region may be provided for reuse (block 280). Note that reuse may be for non-critical storage of non-critical information. While shown with this particular implementation in the embodiment of FIG. 3, understand the scope of the present invention is not limited in this regard.

Figure 4:
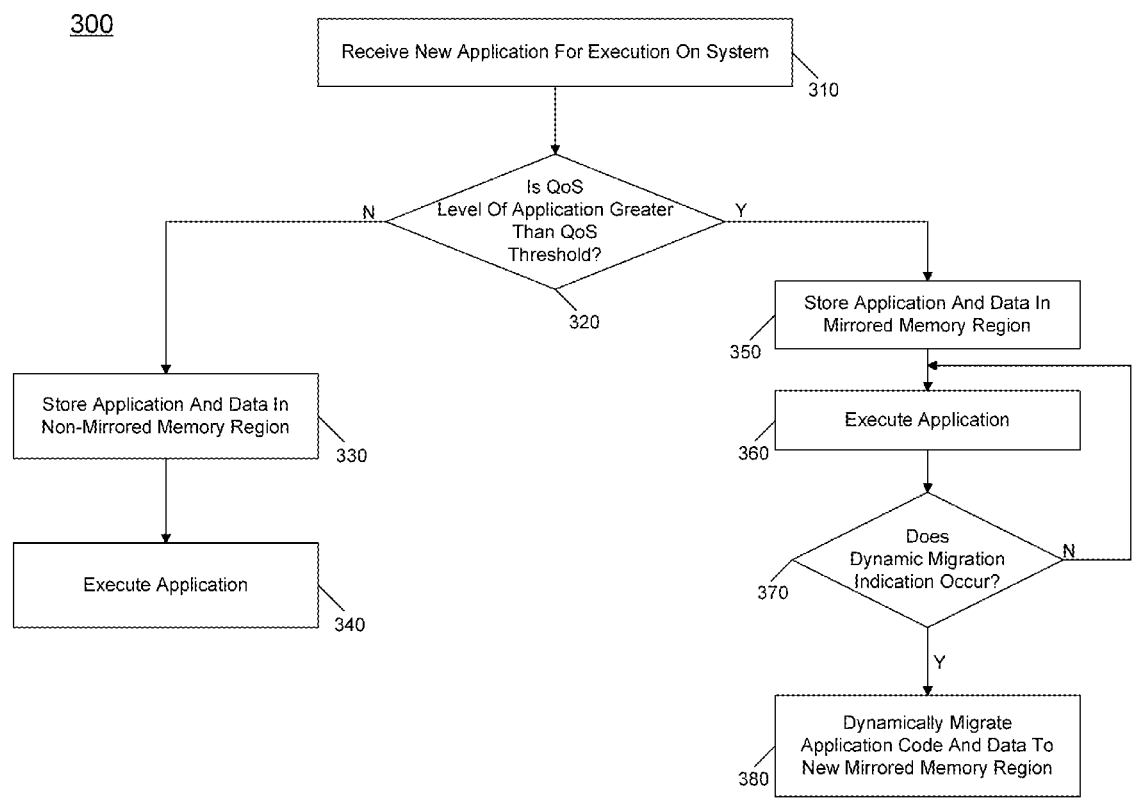
FIG. 4 is a flow diagram of a method for determining whether to store an application into a mirrored memory region in accordance with an embodiment of the present invention.

Referring now to FIG. 4, shown is a flow diagram of a method for determining whether to store an application into a mirrored memory region in accordance with an embodiment of the present invention. As seen in FIG. 4, method 300, which may be implemented by an OS or other supervisor software, may begin by receiving an instruction to execute a new application on a system (block 310). This indication may be received from a user of the system, e.g., by selection of a given application for execution. While described herein with regard to user-level applications, understand the scope the present invention is not limited in this regard. Furthermore, the term "application" is used generically in this embodiment and is equally applicable to virtual machines that execute on a given VMM.

As seen, it may be determined whether a QoS level of the application is greater than a QoS threshold (diamond 320). The determination of diamond 320 may be performed responsive to a QoS indicator for an application received with the request, and a comparison to a QoS threshold. As discussed above, in some embodiments two or more QoS levels may be present to indicate criticality of a given application. If the QoS level of the application is below the QoS threshold, control passes to block 330, where the application and data for the application may be stored in a non-mirrored memory region of the system. At that at this time, the application may execute accordingly (block 340).

Still referring to FIG. 4 if instead it is determined that the QoS level is greater than the QoS threshold, control passes to block 350, where the application and data for the application may be stored in a mirrored memory region of the system. At that time, the application may execute accordingly (block 360). During execution of this application, it may be determined whether a dynamic migration indication is received (diamond 370). Such an indication may be responsive to an error indication, e.g., a correctable or uncorrectable error, or may be based on a time value associated with a regular maintenance of the system memory in which mirrored memory regions are dynamically migrated at some time interval. If such an indication is received, control passes to block 380 where the application's code and data may be dynamically migrated to a new mirrored memory region. While shown as particular embodiment in FIG. 4, understand the scope of the present invention is not limited in this regard.

Figure 5:
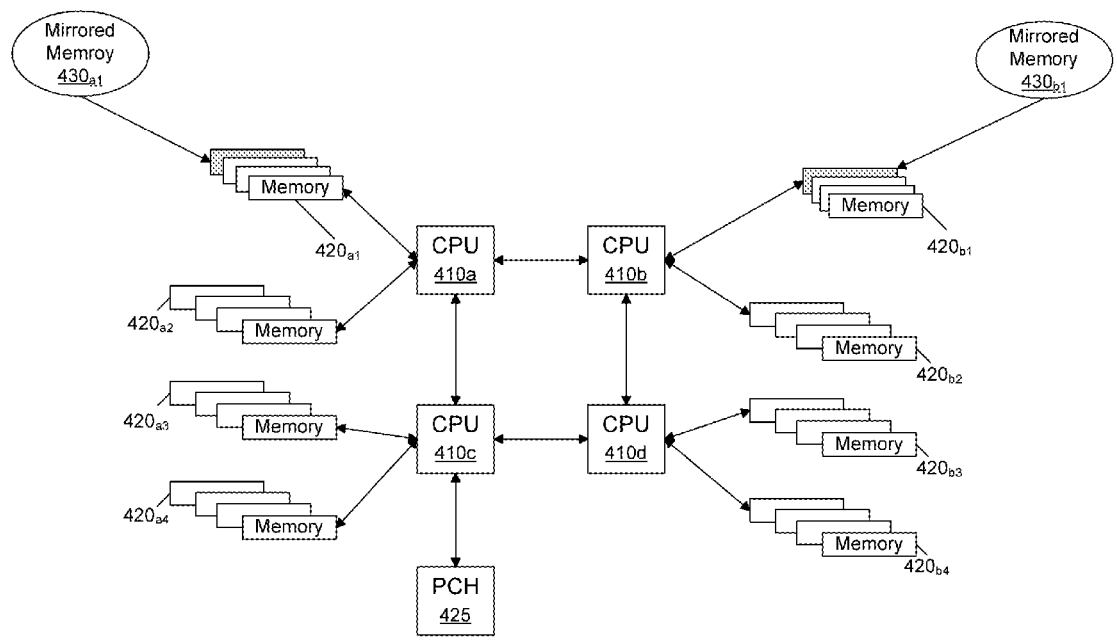
FIG. 5 is a block diagram of a system in accordance with one embodiment of the present invention.

Referring now to FIG. 5, shown is a block diagram of a system in accordance with one embodiment of the present invention. As shown in FIG. 5, system 400 may be a high-availability server including a plurality of processors $410_a$-$410_d$. In one embodiment, each processor may be a multicore processor and may further include additional components such as integrated memory controllers, peripheral controllers and so forth. As seen, each processor is coupled to a local portion of a system memory. For example, processor $410_a$ is coupled to local memories $420_{a1}$ and $420_{a2}$, which may be memory modules formed of DIMMs. In turn, processor $410_c$ may be coupled to local memories $420_{a3}$ and $420_{a4}$. Similarly, processor $410_b$ may be coupled to local memories $420_{b1-b2}$ and processor $410_d$ coupled to local memories $420_{b3-b4}$. As seen, the processors may be coupled via point-to-point (PtP) interconnects.

In various embodiments, each processor 410 may include or be associated with a corresponding memory controller. The memory controller may include or be associated with a home agent that in turn may include one or more tables to enable operations in accordance with an embodiment of the present invention. Such tables may include memory configuration tables that indicate where current and/or possible mirrored regions or pages are located. The home agent may, in some embodiments, be a front end of the memory controller. The memory controller may control accesses to various memory modules, including locally coupled modules $410_{a1}$ and $410_{a2}$. Similar memory controllers may be present in each processor.

In the embodiment of FIG. 5, instead of having a fully mirrored memory system which can reduce the available amount of true memory capacity while raising complexity and power consumption, a partially-mirrored scheme is present. Thus as seen, portions of local memories $420_{a1}$ and $420_{b1}$ may be mirrored, while none of the other memories include redundant data. According to embodiments described herein, critical information, e.g., of an OS or VMM or critical applications such as high priority VMs can be stored in a mirrored region $430_{a1}$ of memory module $420_{a1}$ and mirrored in a corresponding mirrored region $430_{b1}$ of memory module $420_{b1}$. As further seen in FIG. 5, a peripheral controller hub 425 may be coupled to processor $410_c$ and which in turn may be coupled to various peripheral devices such as input/output (IO) devices, mass storage and so forth. While shown with this particular implementation in the embodiment of FIG. 5, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an application to be executed in a system having a system memory including a first mirrored memory region and a first non-mirrored memory region;
   determining whether a quality of service (QoS) of the application exceeds a threshold, wherein the QoS is associated with a cost to access the application; and
   if so storing the application and data for the application in the first mirrored memory region, otherwise storing the application and the data for the application in the first non-mirrored memory region.

2. The method of claim 1, further comprising determining whether an indication of a dynamic migration has occurred.

3. The method of claim 2, further comprising responsive to the dynamic migration indication, dynamically migrating the application and the data to a second mirrored memory region.

4. The method of claim 2, wherein the indication of the dynamic migration is responsive to an error indication.

5. The method of claim 2, wherein the indication of the dynamic migration is passage of a time interval, wherein the dynamic migration occurs responsive to each occurrence of the passage of the time interval.

6. The method of claim 1, further comprising:
   responsive to a loss of redundancy with respect to the first mirrored memory region and a second mirrored memory region, determining a first new mirrored memory region and a second new mirrored memory region, based on possible memory configuration information stored in the system; and
   migrating information stored in the first mirrored memory region to the first new mirrored memory region and migrating information stored in the second mirrored memory region to the second new mirrored memory region.

7. The method of claim 6, further comprising freeing the first mirrored memory region and the second mirrored memory region for system reuse.

8. The method of claim 1, further comprising determining whether redundant storage of code for a configuration of the system is indicated, and if so loading the code into a redundant region of a first memory and a second memory of the system memory.

9. The method of claim 8, further comprising storing kernel code and data in the redundant region and storing application code and data in a non-redundant region.

10. The method of claim 8, further comprising configuring the redundant region using current memory configuration information and possible memory configuration information obtained from a current configuration table and a possible configuration table.

11. The method of claim 8, further comprising storing code and data of a first virtual machine (VM) in the redundant region of the first and second memories, the first VM associated with a first user to receive a first QoS level, and wherein a non-mirrored memory region of the first and second memories is to store code and data associated with a second VM, the second VM associated with a second user to receive a second QoS level, the second QoS level less than the first QoS level.

12. An article comprising a non-transitory machine-readable storage medium including instructions that when executed cause a system to:
   receive an application to be executed in the system, the system having a system memory including a first mirrored memory region and a first non-mirrored memory region;
   determine whether a quality of service (QoS) of the application exceeds a threshold, wherein the QoS is associated with a cost to access the application; and
   if so store the application and data for the application in the first mirrored memory region, otherwise store the application and the data for the application in the first non-mirrored memory region.

13. The article of claim 12, further comprising instructions that when executed enable the system to perform dynamic migration of at least one of the application and the data for the application in the first mirrored memory region responsive to passage of a time interval, wherein the dynamic migration occurs upon each successive occurrence of the passage of the time interval.

14. The article of claim 12, further comprising instructions that when executed enable the system to dynamically migrate the application and the data to a second mirrored memory region.

15. The article of claim 12, further comprising instructions that when executed enable the system to dynamically migrate responsive to an error indication.

16. The article of claim 12, further comprising instructions that when executed enable the system to:
   responsive to receipt of an indication of a loss of redundancy with respect to the first mirrored memory region and a second mirrored memory region, determine a first new mirrored memory region and a second new mirrored memory region, based on possible memory configuration information stored in the system; and
   migrate information stored in the first mirrored memory region to the first new mirrored memory region and migrate information stored in the second mirrored memory region to the second new mirrored memory region.

17. A system comprising:
a plurality of processors, each of the plurality of processors coupled to at least one other of the processors and further coupled to a portion of a system memory locally coupled to the corresponding processor; and
the system memory coupled to the plurality of processors and in a partially mirrored configuration in which a first mirrored memory region that includes a first portion of the system memory coupled to a first processor is to be partially mirrored with a second mirrored memory region that includes a second portion of the system memory coupled to a second processor, wherein the system memory includes instructions to:
enable the system to receive an application, determine whether a quality of service (QoS) of the application exceeds a threshold, wherein the QoS is associated with a cost to access the application, and if so store the application and data for the application in the first mirrored memory region, otherwise store the application and the data for the application in a first non-mirrored memory region.

18. The system of claim 17, wherein the system memory further includes instructions to:
responsive to an indication of a loss of redundancy with respect to the first mirrored memory region and the second mirrored memory region:
determine a first new mirrored memory region and a second new mirrored memory region, based on possible memory configuration information stored in the system; and
migrate information stored in the first mirrored memory region to the first new mirrored memory region and migrate information stored in the second mirrored memory region to the second new mirrored memory region.

19. The system of claim 17, wherein the system memory includes instructions to perform dynamic migration of at least one of the application and the data for the application in the first mirrored memory region responsive to passage of a time interval, wherein the dynamic migration occurs upon each successive occurrence of the passage of the time interval.

* * * * *